United States Patent [19]

Bressani

[11] 4,232,846

[45] Nov. 11, 1980

[54] BASE FOR POLES

[76] Inventor: Raymond Bressani, 137 Deschenes St., Rawdon, (Domaine Langlois), Canada, J0K 1S0

[21] Appl. No.: 14,997

[22] Filed: Feb. 26, 1979

[51] Int. Cl.$^{2}$ .............................................. F16M 13/00

[52] U.S. Cl. ....................................... 248/158; 52/295

[58] Field of Search ............... 248/519, 523, 346, 158, 248/524; 52/40, 295, 296

[56] References Cited

U.S. PATENT DOCUMENTS

| | | | |
|---|---|---|---|
| 1,624,237 | 4/1927 | Hanna | 52/295 X |
| 2,625,130 | 1/1953 | Morser | 248/158 UX |
| 2,928,633 | 3/1960 | Holmes et al. | 248/523 X |
| 3,013,688 | 12/1961 | Luning | 248/346.1 UX |
| 3,038,688 | 6/1962 | Thorburn | 248/523 X |
| 3,119,588 | 1/1964 | Keats | 248/158 |
| 3,144,375 | 8/1964 | Day | 52/40 X |
| 3,231,229 | 1/1966 | Morella | 248/158 |
| 3,288,413 | 11/1966 | Gregory | 248/158 |
| 3,305,990 | 2/1967 | Hageby | 248/346 X |
| 3,415,475 | 12/1968 | Goodman | 248/158 |

FOREIGN PATENT DOCUMENTS

| | | |
|---|---|---|
| 218955 | 5/1922 | Canada . |
| 251089 | 6/1925 | Canada . |
| 574941 | 4/1959 | Canada . |
| 887907 | 12/1971 | Canada . |

*Primary Examiner*—J. Franklin Foss

[57] ABSTRACT

A base for poles comprises a first block of concrete of predetermined shape, having lateral walls covered with a layer of asbestos cement or plastic, a second smaller block, of predetermined shape, having lateral walls covered with a layer of asbestos cement or plastic and partly submerged into the first block of concrete, and a tubular sleeve embedded vertically in the first concrete block and extending into a hole of predetermined diameter in the first block. The second block and the portion of the tubular sleeve located within the second block serve as a socket for receiving a pole.

5 Claims, 8 Drawing Figures

BASE FOR POLES

This invention relates to a base for poles, such as lamp poles.

It has been the general practice, up to now, to make the poles and bases in one piece, so that a large inventory of poles of various lengths and sizes mounted on bases of various shapes, were required. This takes up a large storage space. It is also very difficult to satisfy all customers, since it is almost impossible to maintain a complete line having all possible combinations of bases and poles.

It is therefore the object of the present invention to provide a base which is made separate from the pole and can take up a large number of poles of various lengths and sizes.

The base in accordance with the invention comprises a first block of concrete of predetermined shape having lateral walls covered with a layer of asbestos cement or plastic, a second smaller block of concrete, of predetermined shape, having lateral walls covered with a layer of asbestos cement or plastic and partly submerged into the first block of concrete, and a tubular sleeve embedded vertically into the first concrete block and extending into a hole of predetermined diameter in the first block. The second block and the portion of the tubular sleeve located within the second block serve as a socket for receiving a pole.

A pin, a disc or other structural member, is preferably secured to the sleeve for anchoring the sleeve in the first concrete block and also forms a seat for the second block.

The hole in the second block may be of the same diameter as the outside diameter of a pole which has the same inner diameter as the outer diameter of the tubular sleeve, so as to fit tightly over the tubular sleeve. The hole may also be made of a diameter such as to make the base suitable to receive poles of different sizes. In such an embodiment, a rubber or plastic packing is partly embedded in the second concrete block and has an elastic lip contacting the pole, so as to improve appearance of the assembly.

The tubular sleeve preferably extends a short distance above the level of the second concrete block and a setscrew is threaded through the pole for fixing the pole on the tubular sleeve.

When the pole is used to support an electrical device, an electrical conduit is embedded in the cement between the tubular sleeve and the outside wall of the first concrete block for passing electrical wires.

The invention will now be disclosed, by way of example, with reference to preferred embodiments illustrated in the accompanying drawings and in which.

Figure 1:
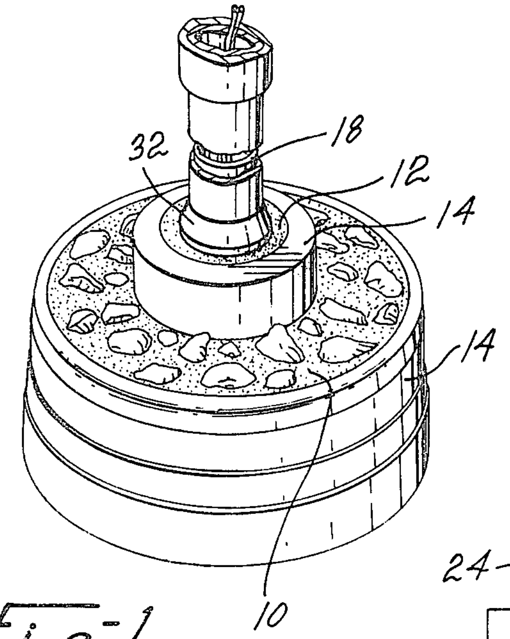
FIG. 1 illustrates a perspective view of a base in accordance with the invention.
Figure 2:
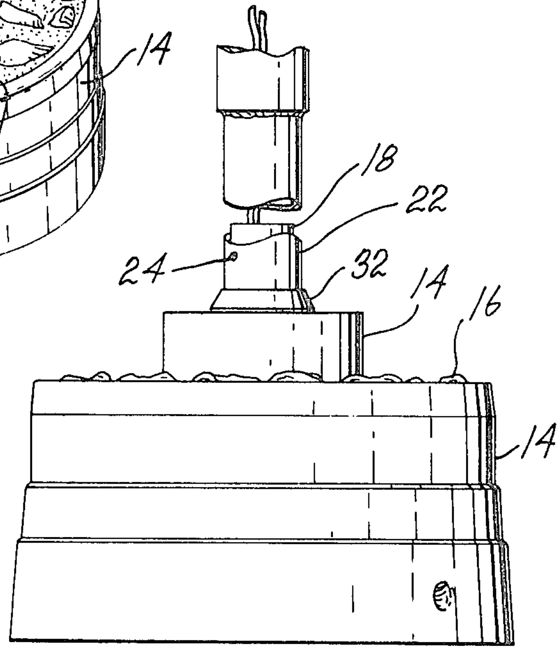
FIG. 2 illustrates a side view of the base of FIG. 1.
Figure 3:
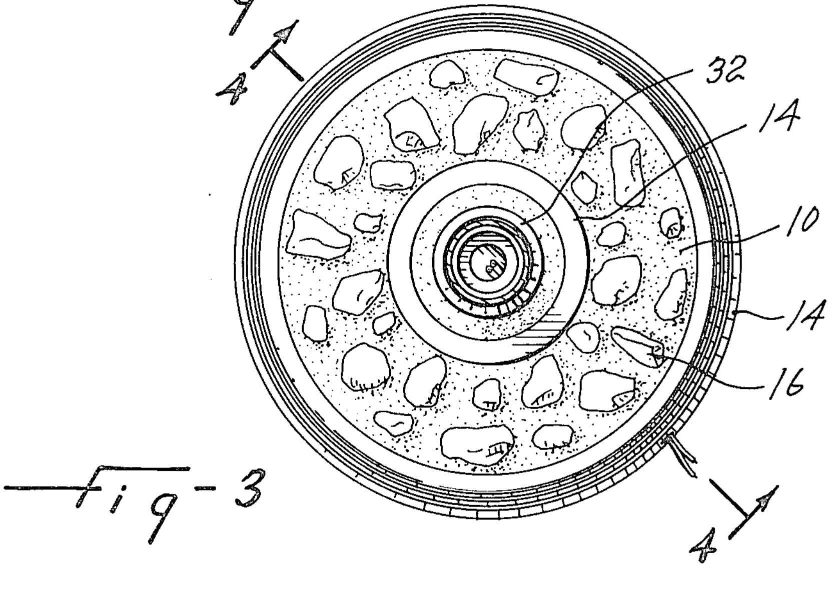
FIG. 3 illustrates a top view of the base of FIG. 1.

Referring to FIGS. 1-4 of the drawings, there is shown a base made of a first cylindrical block 10, of concrete material, into which is partly submerged a second concrete block 12, of smaller size. Both blocks are covered with a protective layer 14, of asbestos cement or plastic, also used for appearance purposes. The top of the first concrete block is also covered with decorative stones 16. It is to be understood that the base is not necessarily circular in horizontal cross-section, but could be square, rectangular or of other configuration.

A tubular sleeve 18 is embedded vertically in the first concrete block and anchored in the concrete by means of a structural member 20 secured to the sleeve. Such structural member also forms a seat for the second concrete block. The structural member 20 may be a pin passing through the tubular sleeve 18 or a circular plate having a hole for receiving the tubular tube and being welded, or otherwise secured, to such tubular sleeve.

Figure 4:
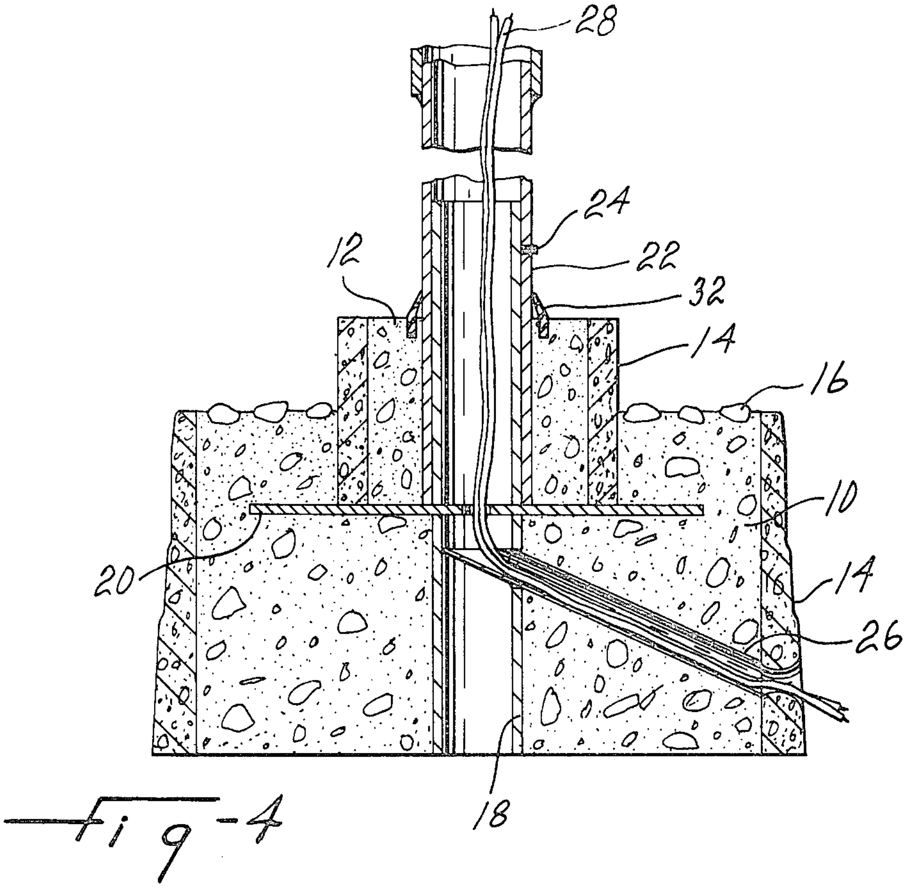
FIG. 4 illustrates a section taken along line 4—4 of FIG. 3.

Referring to FIG. 4, the second concrete block has a hole therein, which is of the same diameter as the outer diameter of a pole 22 which has the same inner diameter as the tubular sleeve 18, so as to tightly receive the pole 22 between the walls of the hole in the concrete and the tubular sleeve. This may be easily done during casting of the concrete block by inserting a short pipe of the same diameter as the pole over the sleeve 18. The pole 22, after assembly, is secured to the sleeve 18 by a setscrew 24. When the pole is used for mounting an electrical device, such as a lamp, a conduit 26 is embedded in the concrete between the sleeve 18 and the outside wall of the block for passing electrical wires 28.

Figure 5:
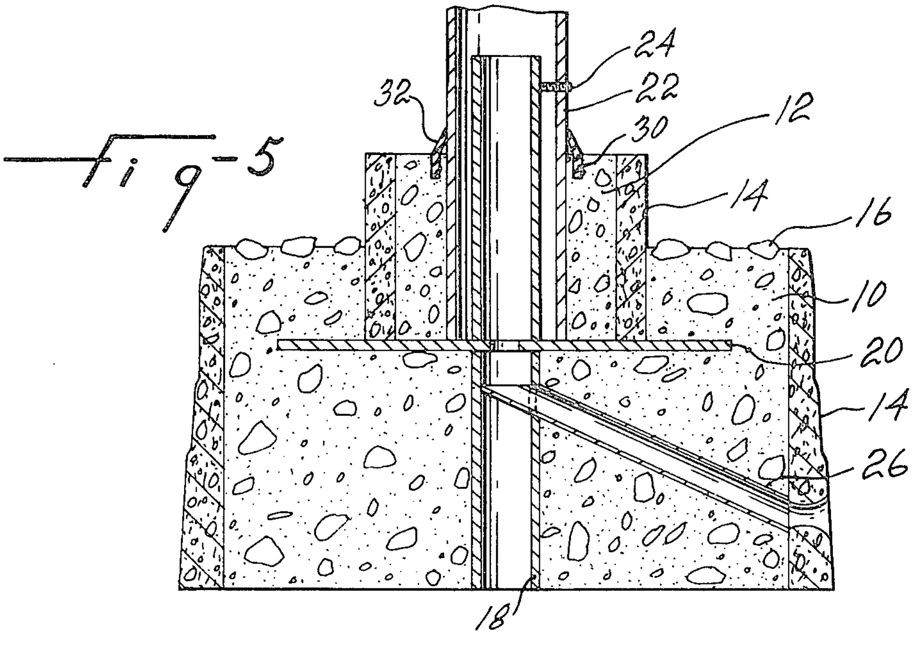
FIG. 5 illustrates a section view similar to FIG. 4 but taken through an alternative embodiment of the invention.

Referring to FIG. 5, there is shown another embodiment for mounting poles of two different diameters, say 2" and 3" poles. The base is identical to the one of FIGS. 1-4, except that the tubular sleeve 18 is of a diameter slightly smaller to receive a 2" pole over it (not shown), whereas the hole in the second concrete block is of a diameter such as to receive a 3" pole. In order to provide a neat appearance and to prevent water or snow ingress, a rubber, or plastic packing 30, is embedded in the concrete of the second block and such packing has an elastic lip 32 which can fit tightly over either the 2" or the 3" pole.

Figure 6:
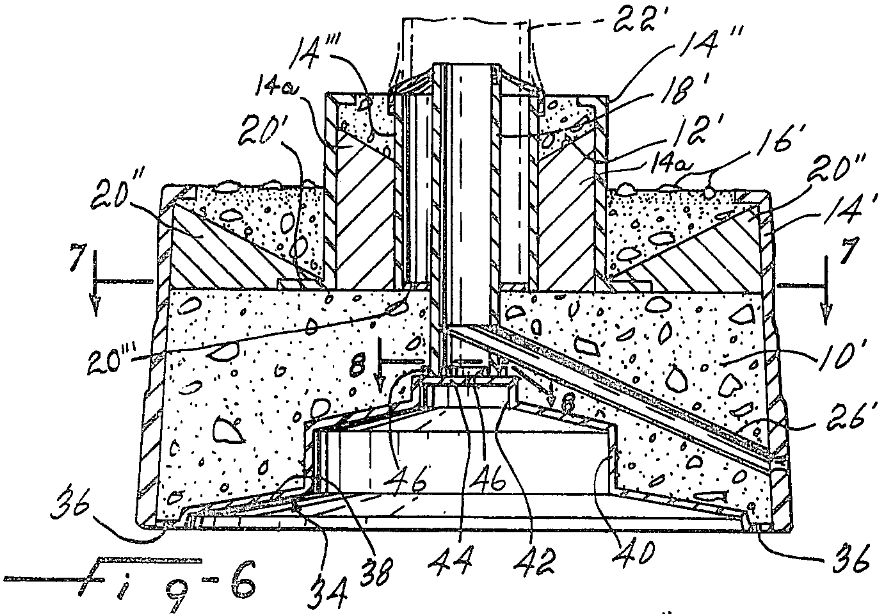
FIG. 6 illustrates a section view similar to FIG. 4 but taken through still another embodiment of the invention.
Figure 7:
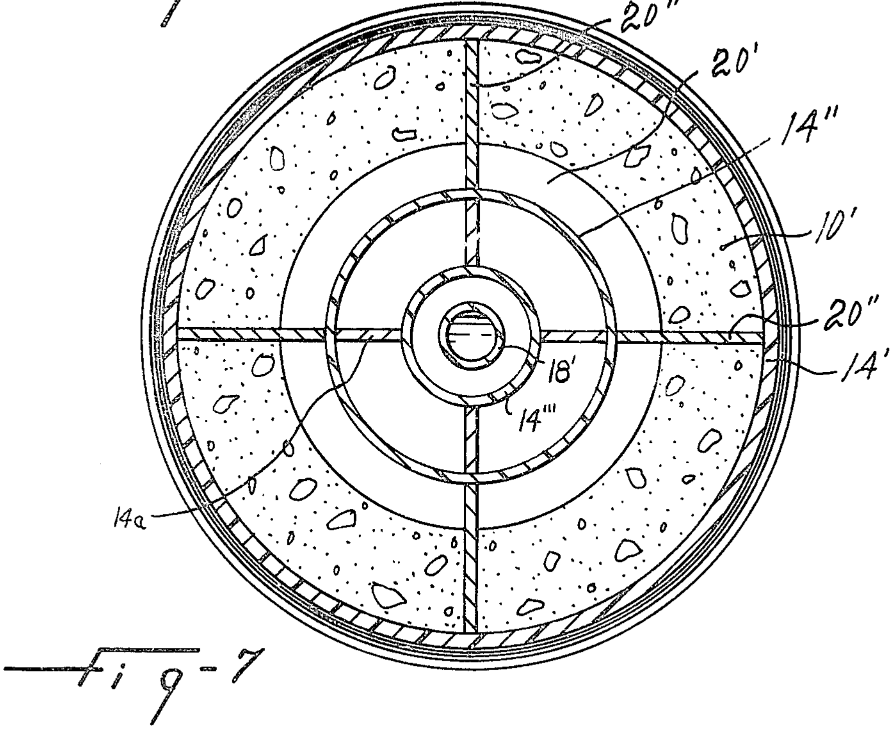
FIG. 7 illustrates a plan section taken along line 7—7 of FIG. 6.
Figure 8:
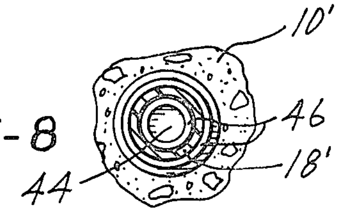
FIG. 8 is a partial plan section taken along line 8—8 of FIG. 6.

Referring to FIGS. 6 to 8, there is shown still another embodiment for mounting poles of various diameters. Also, the base is arranged so that several bases can be stacked directly one on top of the other in stable condition. The base of FIGS. 6 to 8 includes a first cylindrical block 10', of concrete material, into which is partly submerged a second concrete block 12', of smaller size. Both blocks are covered by a protective layer 14', 14", of plastic material. The top of the first concrete block is also covered with decorative stones 16'. A tubular sleeve 18' is embedded vertically in the first concrete block 10' and anchored in the concrete by means of a structural member 20' consisting of an annular part integral with the layer 14" and surrounding the same and extended by vertically positioned triangular webs 20" which abut at their outer ends against the inner surface of the protective layer 14' for the concrete block 10', in order to center layer 14' with respect to layer 14" during pouring of the concrete. An inner plastic layer 14'" lines the inside surface of the hole made in the second concrete block 12'. Said layer 14'" is maintained concentric with sleeve 18' by a washer 20'" surrounding sleeve 18' and fitted within the lower end of layer 14'''. The latter has vertically positioned triangular webs 14a embedded in block 12' and abutting against layer 14''. The underface of the base is covered by a cap member 34, made of plastic material and having a snap-fit with the protective layer 14'. The cap 34 has drain holes 36 at its periphery and forms a frusto-conical part 38 extended by an upwardly extending cylindrical part 40, in turn extended by a smaller diameter cylindrical part 42 co-axial with the base. The part 42 has a top 44 provided with two concentric ribs 46 adapted to receive between them the lower end of the tubular sleeve 18'. The cavity 40 is adapted to receive the upwardly protruding portion of the second block 12' of an underlying base when the bases are in stacked position, while the cavity 42 is adapted to receive the free end of the tubular sleeve 18' of the underlying base, all while the edges of the base lie directly on top of the first concrete block of the underlying base. Poles 22', of various diameters, can be inserted within the hole of the second block and rest on the washer 20'''. A pole, of minimum diameter, would tightly fit around the tubular sleeve 18'. A pole, of maximum external diameter, will tightly fit against the inner lining 14'''. It is obvious that a shim, not shown, for instance a cylindrical shim of appropriate inner and outer diameter, can be inserted, also within the hole of the second block, either outside or inside the pole, depending on the diameter of the same, so that both internal and external faces of the pole will be engaged within the hole. Also, external shims can be used, having an inner bore of other than circular cross-sections, for instance a rectangular or an hexagonal bore to receive with a tight fit poles having an external cross-section other than circular, for instance rectangular or hexagonal. If the pole is adapted to receive electrical wires for mounting an electrical device, the base will then have a conduit, such as conduit 26', embedded in the concrete of the first block between the sleeve 18' and the outside wall of the block for passing the electrical wires.

The assembly of plastic layer 14''', with its webs 14a (see FIG. 6), can be arranged so that the outer edges of webs 14a will have a sliding fit with the inner surface of layer 14''. Therefore, before concrete is poured, said assembly can be vertically moved between a lower and an upper position (the lower position being shown in FIG. 6). In the lower position, the upper end of the tube 18I is accessible for the use of a setscrew, such as setscrew 24 of FIG. 5, for securing a post to tube 18'. When such a setscrew is not necessary, concrete can be poured in the base while the assembly is in upper position with the top of layer 14''' substantially flush with the top of tube 15'.

Although the invention has been disclosed with reference to preferred embodiments, it is to be understood that various modifications could be made to those embodiments within the scope of the claims.

What I claim is:

1. A base for poles comprising:

(a) a first block of concrete of predetermined shape, having lateral walls covered with a layer of asbestos cement or plastic;

(b) a second smaller block of concrete of predetermined shape having lateral walls covered with a layer of asbestos cement or plastic and partly submerged into said first block of concrete; and (c) a tubular sleeve embedded vertically into the first concrete block and extending into a hole of predetermined diameter in the second block, said second block and the portion of the tubular sleeve located within said second block, serving as a socket for receiving a pole and wherein the hole in said second block is of the same diameter as the outer diameter of a pole having the same inner diameter as the outer diameter of said tubular sleeve, so as to fit tightly over said tubular sleeve.

2. A base as defined in claim 1, further comprising a structural member secured to said sleeve for anchoring said sleeve in the first concrete block and also for forming a seat for said second block.

3. A base as defined in claim 1, wherein said sleeve extends a short distance above the level of the second block and further comprising means for locking said pole to said sleeve.

4. A base as defined in claim 1, wherein said pole is used to support an electrical device, and further comprising an electrical conduit embedded in the concrete of the first block and communicating the sleeve with the outside of the lateral walls for passing electrical wires.

5. A base as defined in claim 1, further including a bottom cover fitted within said first block and having a cavity to receive the second block of an underlying base when at least two bases are stacked.

* * * * *